Albert G. Thomas  INVENTOR.

June 7, 1960

A. G. THOMAS 2,939,333

AUTOMATIC CONTROL DEVICES

Original Filed March 29, 1955

INVENTOR.
Albert G. Thomas
By Diggins + LeBlanc
ATTORNEYS.

United States Patent Office 2,939,333
Patented June 7, 1960

2,939,333

AUTOMATIC CONTROL DEVICES

Albert G. Thomas, Butler, Pa., assignor to Industrial Controls Corporation, Chattanooga, Tenn., a corporation of Tennessee Original application Mar. 29, 1955, Ser. No. 497,755. Divided and this application May 29, 1957, Ser. No. 662,539

9 Claims. (Cl. 74—472)

This invention relates to digital or step motors and to automatic control systems using these motors which are in some respects similar to motors described in my issued Patents 2,774,922 and 2,781,848 and co-pending applications Serial Number 436,653, filed June 14, 1954, now abandoned; Serial Number 448,021, filed August 5, 1954, now Patent No. 2,837,670, dated June 3, 1958; and Serial Number 452,949, filed August 30, 1954, now Patent No. 2,806,987, dated September 17, 1957. This application is a division from my co-pending application Serial Number 497,755, filed March 29, 1955, now abandoned.

These step motors may be used for automatically controlling machine tools in conjunction with a tape, punched, printed, or embossed cards or other record. The motors may also be applied in indexing, transfer, feeding, assembly, telemetering, facsimile, television, computers, radio photography, synchronized drives, control of aircraft members and guided missiles, and other operations.

It is an object of the present invention to provide new concepts, and improvements on the prior motors and control systems.

An object is to provide a motor system which will rapidly increase the rate of travel of a milling machine table, or any other movable part of a machine tool or other device.

Another object is to provide a motor system which will quickly reverse and rapidly return a milling machine table or any other movable part of a device to the starting position as, for instance, when a cutting tool is applied in only one direction.

Another object is to provide an automatic control system employing an endless belt or tape which can be repeatedly passed through a sensing device to cause a machine to perform sequential operations or to shape a symmetrical workpiece with a relatively short tape.

A further object is to provide an automatic control system in which the rotational speed of a cutting tool is controlled by a tape or other record.

An additional object is to provide a step motor with a ring circuit for distributing current to the phase windings of the motor, and means for reversing the effective direction or sequence of operation of the ring circuit.

Other objects will be evident in the following description.

Figure 1:
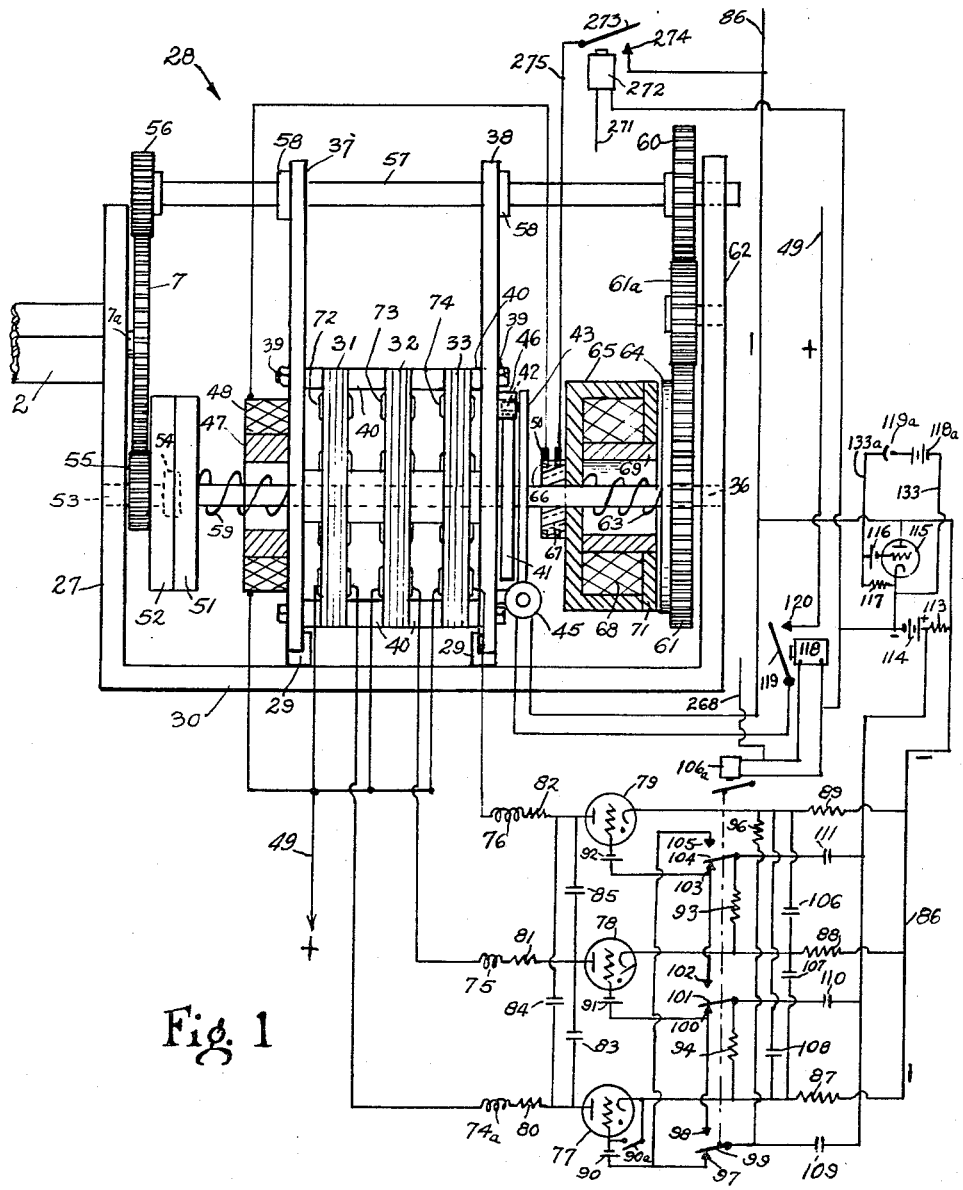
Figure 1 is a front elevation of a step motor and associated gearing and clutches for changing the speed of a driven shaft which may drive any suitable mechanism.

In Figure 1 fragmentary member 2 represents the table of a milling machine or a part of any other device. The screw or shaft which moves table 2 to the right or left is attached to shaft 7a to which gear 56 is fastened.

Figure 2:
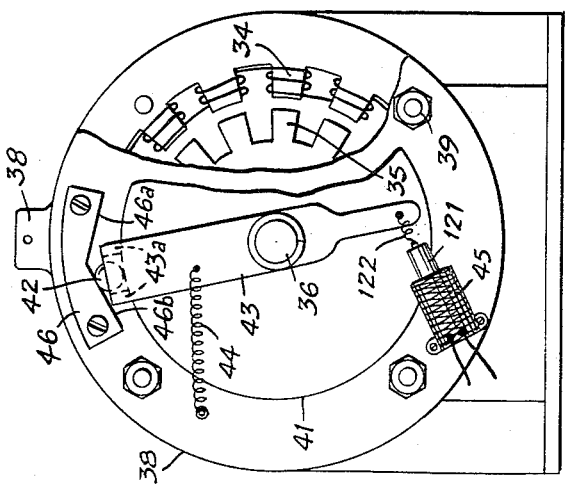
Figure 2 is an end view of the table drive motor shown in Figure 1, as seen from the right with clutch mechanism removed.

A bracket 27 is bolted to table 2 and supports a step motor generally indicated at 28 by means of spacers 29 which are bolted to the bracket plate 30 which is integral with bracket plate 27. The motor 28 comprises three stator sections 31, 32, and 33 having the same number of inwardly directed radially aligned teeth or poles 34 as shown in Figure 2. The inner circumferential width of these poles is preferably equal to the circumferential spacing between them. The rotor poles or teeth 35 are likewise equally spaced and outwardly radially directed. The circumferential width of these poles is substantially equal to the circumferential width of the stator poles. There are an equal number of stator poles and rotor poles in each of the three sections or phases of the motor.

Motor shaft 36 is rotatable in suitable bearings in end plates 37 and 38 which are clamped by bolts 39 and associated nuts against outer spacers 40 which are situated between the stator sections 31, 32, and 33 and between the end plates and outer stator sections 31 and 33. These spacers are bored so that bolts 39 may pass through them. There can be any desired number of clamping bolts but from four to eight are sufficient in most cases.

Hardened steel disc 41, having a relatively smooth rim, is fastened or keyed to the motor shaft and rotates with it. Hardened roller 42 is arranged in a cage extending from the arm 43 and may be brought into contact with either surface of inverted V cam 46 which is fastened to plate 38. This cam may also be hardened. Normally, tension spring 44, attached to arm 43 and to a pin on the frame or plate 38, urges arm 43 counter clockwise (as seen in Figure 2) about the motor shaft which supports it, so that roller 42 allows clockwise rotation of disc 41 but is pinched between cam 46 and disc 41 to lock the disc and rotor against rotation in counter clockwise direction. Solenoid 45 is attached to plate 38 and its armature 121 is fastened to the lower end of arm 43, preferably by means of a stiff spring 122. When this solenoid is supplied with current through its winding, arm 43 is rotated clockwise as viewed from the right, and roller 42 is moved over against the opposite inclined surface 46a of cam 46 and by means of a pinching action, prevents clockwise rotation of the disc and rotor but allows counter clockwise rotation.

Annular ring 47, of good permeability iron or steel, is fastened to plate 37 concentric with motor shaft 36. This ring is surrounded by magnetizing winding 48 one terminal of which is connected with positive line 49 and the other terminal of which is connected with brush 50. Clutch plate 51 is keyed to shaft 36 to slide thereon and to rotate therewith. This plate or disc is normally pressed against cooperating clutch disc 52 coaxial therewith by spring 59. These clutch plates may be surfaced with any suitable clutch material. Plate 52 is rotatable on stub shaft 53 screwed into a threaded hole in plate 27 and shaft 53 is provided with a recessed head 54 to prevent the plate from moving axially. Pinion 55 is fixed to plate 52 and serves to rotate meshed gear 7 which rotates the feed screw shaft 7a for moving table 2 to the right or left, as seen in Figure 1. Smaller gear 56 is fastened to an end of shaft 57 which is rotatable in bearings in extended plates 37 and 38. Collars 58 attached to shaft 57 prevent this shaft from shifting axially to any appreciable degree. Compression spring 59 surrounding shaft 36 normally pushes against plate 37 and clutch plate 51 to hold this clutch engaged. When, however, winding 48 is energized, iron or steel plate 51 is attracted away from plate 52 and shaft 36 does not then drive gears 55 and 56.

Gear 60, which may be approximately of the same diameter as gear 56, is fastened to shaft 57 and is meshed with idler gear 61a which is rotatable on a suitable stub shaft attached to plate 62 which is turned up from plate 30. Idler gear 61a is also meshed with gear 61 which, normally, is freely rotatable on shaft 36 which is supported in bearings in plates 27 and 62.

Gear 61 is normally urged to the right by compression spring 63 which pushes against magnetizable steel disc 64 fastened to gear 61 and against cup-like member 65 having a hub around which slip rings 66 and 67 are fastened in insulated manner. These slip rings are connected, respectively, with the two ends of magnetizing winding 68 which surrounds centrally located annular magnetizable ring 69 which is integral with member 65. Brush 50 is in contact with slip ring 66 and brush 70 is in contact with slip ring 67. Face plate 71 may be of non-magnetic material if desired. It will be seen that if current is passed through windings 48 and 68 in series, clutch plate 51 will be suddenly pulled to the right to break the driving connection between motor shaft 36 and gear 55 and clutch plate 64 will be simultaneously pulled to the left to engage plate 71 to be driven thereby. This causes shaft 36 to turn gear 61 which rotates gears 61a and 60, shaft 57, gear 56, and gear 7. Since the driving gear ratio will, under those conditions, be considerably higher than when the clutch windings are not energized, the rate of travel of table 2 will be considerably faster than is the case normally when clutch plate 51 is driving plate 52 and gear 55. This stepped-up rate of movement of the table is useful for quick traverse and for a faster rate of cutting for gentle curves and straight lines. Gear 61a is wide enough to maintain the mesh with gear 61 even through it slides. When the clutch windings are de-energized the springs 59 and 63 quickly restore the clutches to the positions illustrated, with shaft 36 driving gears 55 and 7 and gear 61 floating. Other types of clutches like the iron powder-oil clutch can be used if very rapid response is desired.

Each pole or each alternate pole of the three stator phases may be provided with respective windings 72, 73, and 74. The coils for each phase may be connected in series, series-parallel, or otherwise. A terminal of each phase winding is connected to positive line 49 and the other three terminals of windings 72, 73, and 74 are connected, respectively, with flexible leads 74a, 75, and 76 which are connected to the anodes of thyratrons 77, 78, and 79 through potential dropping resistors 80, 81, and 82.

Quenching condensers 83, 84, and 85 are connected between the anodes of the thyratrons as shown and serve to help extinguish any conducting thyratron when another is fired. The cathode of thyratron 77 is connected to negative line 86 through resistor 87 and the cathodes of thyratrons 78 and 79 are connected with negative line 86 through respective resistors 88 and 89. Bias sources 90, 91, and 92 are arranged with their negative poles connected with the respective grids of thyratrons 77, 78, and 79. These potential bias sources may be batteries, rectifiers or the like but will be termed "batteries" for convenience.

The positive pole of bias battery 90 is connected to the contact 97 of a three pole double throw relay comprising arms or armatures 99, 101, and 104 and actuating coil 106a. Armature 99 is normally held against contact 97 by a spring but is moved over against contact 98 when coil 106 is energized.

This armature is connected to an end of resistor 96 the other end of which is connected to the cathode of thyratron 79. Contact 98 is connected to contact 100 of the three pole double throw relay which includes armature 101 and other contact 102. Contact 100 is connected to the positive pole of battery 91. Armature 101 is connected to an end of resistor 94 the other end of which is connected to the cathode of thyratron 77. Armature 101 is normally held against contact 100 by the relay spring. Contact 102 is connected to contact 103 which is connected to the positive pole of bias battery 92. Armature 104 of the relay is normally held against contact 103 and this armature is connected to an end of resistor 93. The other end of this resistor is connected to the cathode of thyratron 78. The other contact 105 of the relay is connected to contact 97 and the positive pole of battery 90.

Relay coil 106a, when supplied with current attracts armatures 99, 101, and 104 against respective contacts 98, 102, and 105. These relays may be made with flexible or wiping contacts so that the relay armatures touch contacts 98, 102, and 105 before contact with elements 97, 100, and 103 is broken. In this way the thyratrons are maintained under negative bias so that they will not be fired when the relay armatures are switched over by coil 106a. This coil will of course be placed in proper position to move the three armatures in the desired direction. The armatures may be physically tied together but may be insulated one from the other. Capacitances 106, 107, and 108 are connected between the cathodes of the thyratrons as indicated and serve to aid capacitances 83, 84, and 85 in quenching or extinguishing any conducting thyratron when any other one is fired. It is desirable to limit the capacity of the condensers 83, 84, 85 in order to reduce the circulating currents traversing the motor windings when one thyratron is fired and another is extinguished. These condenser or circulating currents tend to interfere with the normal magnetizing currents in windings 72, 73 and 74 and limit the speed and torque of the motor. I have found that by connecting the condensers 106, 107, and 108 in the cathode circuit as illustrated, the capacitance of condensers 83, 84, and 85 can be reduced and better motor operation results. It is preferable to have the cathode-connected condensers 106, 107, 108 of considerably larger capacitance than the anode-connected condensers 83, 84, 85. As an illustration, in one step motor circuit, I have used condensers of 7½ microfarad capacitance for the anodes and 24 microfarads for the cathodes. In some cases, it is possible to eliminate the anode-connected condensers, using only the condensers connected between the cathodes.

Relatively small condensers 109, 110, and 111 are connected to conductor 112 and to respective relay armatures 99, 101, and 104. Resistor 113 is connected to negative line 86 and to conductor 112 and this resistor is in series with battery or other current source 114 the negative pole of which is connected to the cathode of electronic tube 115. The anode of this tube is connected to negative line 86. The grid of tube 115 is normally negatively biased, preferably to the point of cut-off, by bias battery 116 which is connected to the cathode through resistor 117. This resistor is also connected in series with battery or other current source 118a and phototube 119a which may be of the multiplier type or otherwise. In using the word "phototube," I mean to include phototransistors, or any light-sensitive, heat-sensitive, or radiation-sensitive device or component. Likewise, I use the word "thyratron" to include transistors, ignitrons, or any suitable current control device.

The positive pole of battery 118a is connected to the anode of the phototube, 119a. It is obvious that when phototube 119a is illuminated, current from battery 118a will pass through resistor 117 in a direction to bias the grid of tube 115 positively, the components being so chosen that this positive bias will be considerably higher than the opposing negative bias of battery 116. Therefore, if phototube 119a is briefly illuminated, tube 115 will momentarily become conductive and a pulse of current from battery 114 will be passed through resistor 113 and tube 115. This electrical pulse will be passed through small condensers 109, 110, 111 and will be applied to the grids of thyratrons 77, 78, and 79, through the relay armatures. These pulses are positive and tend to fire the thyratrons but the amplitude of the pulses is so chosen that only a thyratron which has been pre-biased by an associated tube is fired. Assume that tube 77 has been fired. Current from positive line 49 will then pass through motor windings 72 of phase I and through resistors 80 and 87 and line 86. The potential drop across resistor 80 will cause condenser 83 to be charged and the potential drop across resistor 87 will cause condenser 107 to be charged and also will provide a positive bias for the grid of thyratron 78 which is less than the negative bias from battery 91. A pulse of proper amplitude applied to the three condensers 109, 110, and 111 will therefore fire only tube 78, and condensers 83 and 107 will cause tube 77 to be extinguished due to drop of anode potential. In similar manner, current passing through windings 73, resistor 81, tube 78 and resistor 88 will bias the grid of tube 79 less negatively, so that only this tube will be fired when another pulse is applied to condensers 109, 110, and 111. The charged condensers 85 and 106 will cause extinction of tube 78 when tube 79 is fired. In the same manner as described, the current traversing motor windings 74, resistor 82, tube 79, and resistor 89 will cause the grid of tube 77 to have less negative bias so that it will be fired when the next pulse is applied to condensers 109, 110, and 111. The condensers 84 and 108 will cause extinction of tube 79 when tube 77 is fired.

When motor stator windings 72 are energized, the rotor poles are magnetically pulled into alignment with the associated stator poles for that phase. Then if stator windings 73 are energized and windings 72 are deenergized, the positionally phased rotor poles of the second phase are magnetically pulled into alignment with the associated stator poles energized by windings 73. When tube 79 is then fired to energize stator windings 74 of the third phase, the windings 73 being deenergized due to extinction of tube 78, the positionally phased rotor poles of the third phase will be magnetically pulled into alignment with the associated stator poles which are magnetized by windings 74. Then, if the sequence of energization is repeated, the rotor may be caused to revolve in one direction, in steps.

When it is desired, to reverse the direction of rotation of the rotor of motor 28, relay coil 106a is energized as a result of connected phototube 120a being illuminated by light impinging upon it through clear strip 267. Then relay armatures 99, 101, and 104 are quickly snapped over against respective contacts 98, 102, and 105 so that the order of firing the tubes of the ring circuit is reversed. In other words, the potential drop across resistor 87 will then apply a degree of positive bias to the grid of tube 79, the potential drop across resistor 88 will be applied to the grid of tube 77, and the potential drop across resistor 89 will be applied to the grid of tube 78. Therefore, if electrical pulses are applied to condensers 109, 110, and 111 as a result of sudden changes of potential across resistor 113, the tubes will be fired in reverse order so that the motor windings will be energized in reverse order 74, 73, 72 and the rotor will reverse in direction of rotation.

Relay coil 118 is connected in parallel with coil 106 so that relay armature 119 will be quickly snapped against contact 120 simultaneously with the movement of armatures 99, 101, and 104. Positive line 49 is connected with contact 120 and armature 119 is connected with one terminal of solenoid 45 the other terminal of which is connected with negative line 86. When, therefore, coil 118 attracts armature 119 and contact 120 is struck thereby, solenoid 45 is quickly supplied with current and solenoid plunger 121 (Figure 2) is pulled into the solenoid, causing arm 43 to be rotated clockwise so that the cage 43a attached to arm 43 carries roller 42 over against inclined surface 46a of hardened cam 46. This roller will therefore lock disc 41 and the rotor against rotation in clockwise or forward direction but will allow rotation in the reverse direction. Stiff spring 122 connecting the solenoid plunger and arm 43 allows the plunger to be seated and yet maintains sufficient holding force on the arm and roller. When solenoid 45 is deenergized tension spring 44 attached to the arm and plate 38 pulls the arm and roller back so that the roller is in contact with cam surface 46b as shown. Under this condition disc 41 and the rotor can be rotated forward or clockwise but not in the reverse direction.

The locking or braking action is employed to provide stable operation of the step motor. Without it, the rotor tends to oscillate about an aligned position, for any phase, and erratic behavior results. With the one way brake, however, which can be set for either direction, the motor can be operated reliably and at faster speed. The motor can be operated as a synchronous motor without the brake if the phase windings are energized with rhythmic timing but difficulty is experienced in reversing the motor if the brake is not used and in making quick changes of speed.

The positive and negative lines 49 and 86 are connected to a suitable source of direct current such as a motor-generator, rectifier or the equivalent. Transistors, magnetic amplifiers or the like may be used instead of thyratrons to control currents traversing the motor windings.

Figure 3:
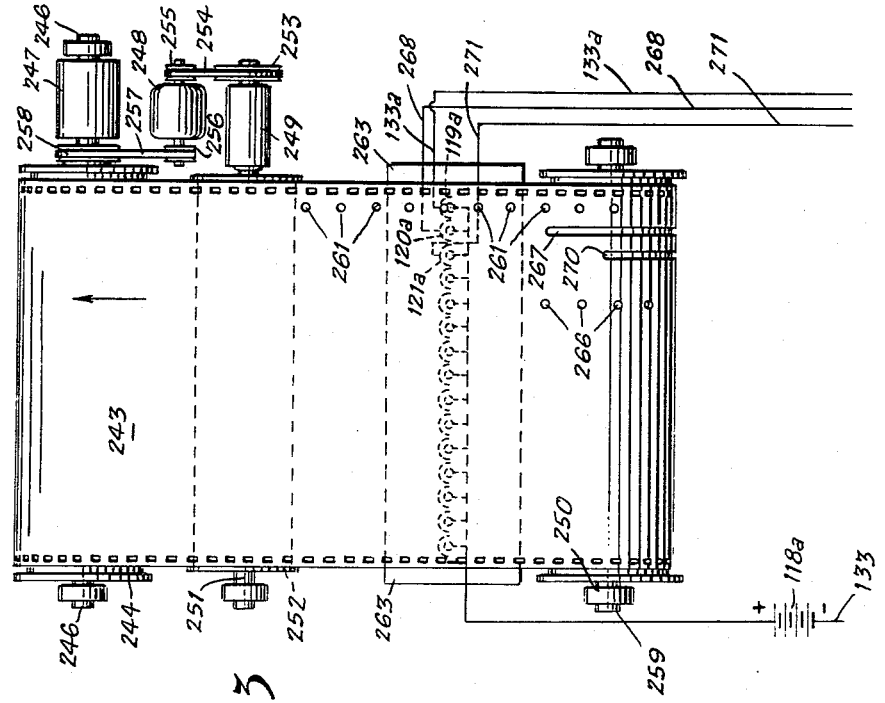
Figure 3 is a plan view of a control tape for driving the motor and clutch assembly of Figure 1
Figure 4:
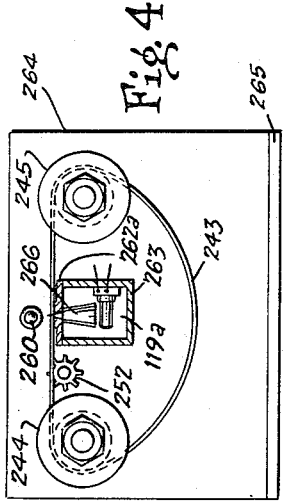
Figure 4 is a simplified side elevation of the control tape of Figure 3.

The belt or tape 243 shown in Figures 3 and 4 is endless and passes over spools 244 and 245 repeatedly. Shaft 246 is rotatable in elongated bearing 247 which is affixed to a suitable base. Motor 248, bearing block 249, and bearing post 250 are also fastened to the same base. Shaft 246 carries attached spool 244 and shaft 251 rotates attached sprocket 252 which moves belt 243. The shaft 251 may be supported entirely from bearing 249 and has attached pulley 253 which is driven by belt 254 passing around pulley 255 on the shaft of motor 248. This motor shaft also has attached pulley 256 around which belt 257 travels. This belt drives pulley 258 attached to shaft 246 and drives spool 244 at a rate which insures that slack will be taken up. It is not essential that pulley 244 be driven but it will assist in moving the belt. Spool 245 is rotatable on shaft 259 which is fastened in bearing post 250 attached to the base. The rear post alone can be used if desired.

In operation belt 243 is placed over these spools and motor 248 connected to a suitable current source. It is assumed that positive line 49 in Figure 1 and negative line 86 are connected to a suitable source of direct current such as a motor-generator, a rectifier, or the like and that the electronic tube filaments are heated by a source of current until operating temperature is reached. With a workpiece properly positioned on table 2, the belt 243 is moved across the photocells, and light from a showcase type lamp 260 as seen in Figure 4 is allowed to strike photocell 119a when holes or translucent areas 261 pass over the opening in the cover 262a of photocell housing 263. This housing is suitably supported on a vertical plate 264 which is attached to base 265. Cover 262a extends over all the photocells shown in Figure 3 and there is a small window in the cover above each photocell. Therefore, if a tape or belt 243, with suitable holes or transparent areas aligned with the cover windows is moved lengthwise, then a photocell will be illuminated briefly whenever a hole or clear portion of the belt passes over the window associated with that photocell. Clear plastic light guides 266 may be used to direct light from the windows down to the photocells. These light guides may be coated with light opaque material like heavy paint to confine the light passing through the window to one photocell. Partitions can be used between the photocells.

The holes or clear areas 261 control the speed of motor 28. Other series of holes such as the holes 266 may be provided to control the speed of other step motors from the same tape 243.

Each time the photocell 119a is illuminated, current from battery line 118a passes through resistor 117 along conductor 133a and back to the battery along conductor 133. This biases the grid of tube 115 positively, in effect overcoming the normal negative bias of battery 116 which biases the grid to the point of cut-off or substantially so. This causes a pulse of current from battery 114 to pass through resistor 113 in a direction to pass positive current or potential pulses through small condensers 109, 110, 111 which, for some thyratron circuits may have a capacitance of 0.02 to 0.1 mfd. each. The amplifier tube 115 sharpens the pulse so that when belt 243 is travelling at moderate speed the pulses passed through the condensers will be of sufficient amplitude to fire a thyratron. One of the thyratrons 77, 78 or 79 should be fired at the beginning, before holes 261 reach photocell 119a. This can be done by manually connecting the grid of say tube 77 momentarily to its cathode by means of switch 90a or an actual positive voltage from a battery can be momentarily applied to the grid. One thyratron of each motor group of three tubes can be simultaneously fired by closing a multi-plate switch, or by disconnecting the negative biases momentarily.

The current flow through resistor 87 will cause a potential drop across this resistor which results in the effective negative bias of tube 78 being reduced i.e., the grid of tube 78 will be at less negative potential with respect to its cathode than was the case before tube 77 was fired. Therefore, if moving holes 261 cause positive pulses to be applied to condensers 109, 110, and 111, these pulses of current and voltage will be applied to all the grids of the tubes 77, 78 and 79 but only thyratron 78 will be fired if the amplitude of the pulses, added to the bias voltage of the grid of tube 78 is sufficient to fire that tube but is insufficient to fire tubes 77 and 79 having full negative bias. When tube 78 is fired charged condensers 83 and 107 cause tube 77 to be extinguished. Now when another moving hole 261 suddenly admits light to photocell 119a another pulse is fed through condensers 109, 110, 111 and tube 79 is fired since the potential drop across resistor 88 was applied to the grid of tube 79 to raise its potential. Charged condensers 85 and 106 cause tube 78 to be extinguished when tube 79 is fired. Now when the next moving hole 261 passes light to photocell 119a thyratron 77 is fired due to the potential drop across resistor 89 which is applied to the grid of tube 77. Repeated pulses passed through the condensers 109, 110, and 111 therefore cause the thyratrons of the ring circuit to be fired in sequence, repeatedly as described. Resistors 94, 93 and 96 are used to provide sufficient positive potential drop to fire the thyratrons, due to pulses from the small condensers. The components of the circuit are chosen with proper values to produce the desired results. As a practical example, the negative potential of bias units 90, 91 and 92 may be 90 volts; the potential drop across resistors 87, 88, 89 may be 30 to 50 volts, and the pulse or firing current passing through condensers 109, 110 and 111 should be of such value that the positive potential drop across resistors 94—87, 93—88, and 96—89 should be high enough to fire the thyratron with least negative potential but not high enough to fire all the thyratrons.

The holes 261 shown will cause the thyratrons to be fired in order 77—78—79 which will cause the rotor of motor 28 to rotate in the forward direction.

As the upper surface of loop belt or tape 243 is driven strip 267, which may comprise a clear portion of tape or closely punched holes, reaches an aperture or window in cover 262a (Fig. 4) over photocell 120a and accordingly, light from lamp 260 illuminates the cathode of this photocell and current from battery 118a passes through conductors 133, 268 and sensitive relay coils 118 and 106a. Therefore, relay contact arm 119 is quickly pulled against contact 120 which causes current from positive line 49 to pass through solenoid winding 45 and to negative line 86 through conductor 269. This results in the solenoid armature 121 (Fig. 2) causing roller 42 to be quickly moved over against cam surface 46a to set the brake for reverse rotation. Under these circumstances disc 41 and the rotor can revolve in counter clockwise direction but not in the opposite or forward direction.

Relay coil 106a is energized simultaneously with coil 118 and pulls relay arms 99, 101, and 104 quickly against their respective reversing contacts 98, 102, and 105. Coil 106a is not shown in true relative position but only diagrammatically. After the relay is moved to reverse position as described, the order of firing of the thyratrons, due to pulses through condensers 109, 110, and 111, will be reversed since the potential drops across resistors 87, 88 and 89 will then be applied to the grids of respective thyratrons 79, 77 and 78. Coil 106a will hold these relay arms against contacts 98, 102, and 105 as long as strip 267 admits light to photocell 120a. When the strip ends and the opaque material of belt 243 blocks light from the photocell, a suitable spring pulls arms 99, 101, and 104 over against respective contacts 97, 100 and 103 so that the order of firing of the thyratrons will again cause forward rotation of the motor 28. When coil 106a is deenergized, relay coil 118 is likewise deenergized and spring 44 (Fig. 2) pulls arm 43 and the roller back to the forward operating position shown.

By placing strip 267 and similar translucent or transparent strips in chosen locations parallel with the rows of holes, any or all motors controlled by the tape can be reversed at predetermined positions of the tape relative to the photocells and for predetermined periods of time. Each of the step motors used may have associated relays similar to the relays associated with coils 106a and 118.

Normally, clutch plates 51—52 are engaged and clutch plates 64—71 are disengaged, which results in pinion 55 rotating gear 7 which turns the screw which drives table 2 to the right or left. Transparent strip 270 is arranged to admit light to photocell 121a when it is desired for motor 28 to drive table 2 at a faster rate than normally, as, for instance, in transverse movement and in making straight or slightly curved cuts. When photocell 121a receives light, current from battery 118a passes through conductors 133 and 271 and through relay coil 272 which then attracts relay arm 273 against contact 274 connected with negative line 86. This closes the circuit including positive line 49, clutch winding 48, clutch winding 68, conductor 275 and negative line 86, and results in magnetizing core 47 which quickly pulls clutch plate 51 away from plate 52 and in magnetizing core 69 to pull clutch plate or disc 64 quickly against clutch plate 71. Therefore, clutch 51—52 is disengaged as clutch 64—71 is engaged and then gear 7 on the screw shaft will be rotated at a considerably faster rate than before since the gear train comprising gears 56, 60, 61a, and 61 is proportioned so that it will turn gear 7 much faster for the same speed of motor shaft 36 than will pinion 55. This construction makes it possible to change the driving rate, for either direction, without clashing of gears. Gear 61a is wide enough to remain in mesh with gear 61 during the axial movement of gear 61. When the end of moving strip 270 is reached, photocell 121a is deprived of light and relay coil 272 is deenergized. A spring then pulls arm 273 away from contact 274 and clutch 51—52 is quickly re-engaged by springs 59 and clutch 64—71 is quickly disengaged by spring 63. While this clutch construction is shown for one motor, similar clutch means may be used in connection with any motor of the machine shown or for other purposes.

The clutch action can be made so fast that there is virtually no slipping or loss of relative position between the motor and shaft 7a. Fast iron particle and oil magnetic clutches or other suitable types may be employed. The tape will of course be prepared to allow for the period of fast operation so that loss of synchronism between the tape and the driven part will not occur. The clutches may be positive engagement types if desired, in order to prevent any loss of synchronism between the motors or other members of the system.

What I claim is:

1. In a device, a movable member, drive means including first gear means connected with said member for driving said member, power means connected with said drive means, a first magnetic clutch including two magnetizable elements rotatably and axially relatively movable connected in said first drive means, second gear means connecting said first clutch and said first gear means to cause rotation thereof at predetermined gear ratio, a spring for normally urging said elements into clutching relationship, a first winding associated with said first clutch for producing a magnetic field to cause relative axial movement of said elements to produce declutching action, a second magnetic clutch including two magnetizable elements rotatably and axially relatively movable, third gear means connecting said second clutch and said first gear means to cause rotation thereof at a predetermined gear ratio different from the ratio including said second gear means, a spring normally holding the elements of said second clutch in de-clutched position, a second winding associated with said second clutch for producing a magnetic field to cause relative axial movement of the elements of said second clutch to cause clutching action thereof, and electrical conductors connecting said windings to cause simultaneous energization thereof.

2. The device as described in claim 1, and including a step motor for driving an element of each said clutch.

3. The device as described in claim 1, and including a step motor for driving an element of each said clutch, said motor having a brake preventing movement of the rotor of said motor of more than a partial step in a direction opposite to the direction of rotation thereof.

4. The device as described in claim 1, and a member connecting an element of the first clutch to an element of the second clutch.

5. In a machine tool system, a movable member, a step motor, first drive means for connecting said step motor and said movable member, said first drive means including first clutch means, resilient means acting upon said first clutch means to make said clutch means normally effective for driving said member at predetermined speed; electromagnetic means connected with said first clutch means and adapted, when energized, to make said first clutch means ineffective; second drive means for connecting said motor and said movable member to drive said member at a speed different from said predetermined speed, said second drive means including second clutch means, resilient means acting upon said second clutch means to make said second clutch means normally ineffective; other electromagnetic means connected with said second clutch means and adapted, when energized, to make said second clutch means effective, and electrical circuit means connecting said electromagnetic means and said other electromagnetic means to cause actuation of said first and second clutch means substantially simultaneously.

6. The system as described in claim 5, and including brake means associated with said motor and adapted to permit substantially free rotation thereof in one direction but preventing rotation thereof of more than a partial step in opposite direction.

7. The system as described in claim 5, and electrical control means including tape means for controlling current in said circuit means.

8. The system as described in claim 5, and electrical control means including tape means for controlling current in said circuit means, means for sensing said tape, and electrical circuit means connecting said tape-sensing means and said current controlling means for actuating said electromagnetic means in accordance with sensings of said tape.

9. The system as described in claim 5, and electrical means including current control means for supplying current to said step motor, means including tape means and tape-sensing means for controlling said curent control means in accordance with sensings of said tape, and current control means connecting said electrical circuit means and said tape-sensing means for controlling said electromagnetic means and said other electromagnetic means in accordance with sensing of said tape.

References Cited in the file of this patent

UNITED STATES PATENTS

| | | |
|---|---|---|
| 1,309,443 | Mascord | July 8, 1919 |
| 1,718,078 | Reece et al. | June 18, 1929 |
| 1,742,147 | Renwick | Dec. 31, 1929 |
| 2,363,208 | Sulzer | Nov. 21, 1944 |
| 2,414,126 | Sevin | Jan. 14, 1947 |
| 2,630,719 | Humbert et al. | Mar. 10, 1953 |
| 2,758,515 | Smith | Aug. 14, 1956 |
| 2,767,598 | Burg | Oct. 23, 1956 |

FOREIGN PATENTS

| | | |
|---|---|---|
| 463,099 | Italy | Apr. 14, 1951 |